(12) United States Patent
Saito et al.

(10) Patent No.: US 12,264,987 B2
(45) Date of Patent: Apr. 1, 2025

(54) TEST PART AUTOMATIC OPERATION DEVICE, TEST PART TESTING SYSTEM, TEST PART AUTOMATIC OPERATION METHOD, AND NON-TRANSITORY COMPUTER READABLE MEDIUM

(71) Applicant: HORIBA, LTD., Kyoto (JP)

(72) Inventors: Takashi Saito, Kyoto (JP); Kazuki Furukawa, Kyoto (JP)

(73) Assignee: HORIBA, LTD., Kyoto (JP)

( * ) Notice: Subject to any disclaimer, the term of this patent is extended or adjusted under 35 U.S.C. 154(b) by 228 days.

(21) Appl. No.: 17/914,340

(22) PCT Filed: Mar. 16, 2021

(86) PCT No.: PCT/JP2021/010562
§ 371 (c)(1),
(2) Date: Sep. 24, 2022

(87) PCT Pub. No.: WO2021/193225
PCT Pub. Date: Sep. 30, 2021

(65) Prior Publication Data
US 2023/0123299 A1    Apr. 20, 2023

(30) Foreign Application Priority Data
Mar. 24, 2020   (JP) ................................ 2020-052595

(51) Int. Cl.
*G01M 17/007*   (2006.01)
(52) U.S. Cl.
CPC ............................... *G01M 17/0072* (2013.01)

(58) Field of Classification Search
CPC .................... G01M 17/007; G01M 17/0072
(Continued)

(56) References Cited

U.S. PATENT DOCUMENTS 10,006,834 B2    6/2018   Tanaka et al.
2017/0169629 A1*  6/2017   Sugihara ............. G01M 17/007

FOREIGN PATENT DOCUMENTS

| JP | 2014115168 A | 6/2014 |
|----|--------------|--------|
| JP | 2015129701 A | 7/2015 |

(Continued)

OTHER PUBLICATIONS

EESR dated Mar. 6, 2024 issued in EP patent application No. 21774419.2.
(Continued)

*Primary Examiner* — Robert R Raevis
(74) *Attorney, Agent, or Firm* — Brooks Kushman P.C.

(57) ABSTRACT

The present invention enables the measuring and evaluating of variations in vehicle fuel consumption and emission test results due to differences in driving style. An automatic operation device that automatically operates a test part based on a command vehicle speed includes a receiving unit, a command vehicle speed shaping unit, and an operation control unit. The receiving unit receives a driving mode set or changed by a user. The command vehicle speed shaping unit shapes a command vehicle speed r(t) based on the driving mode received by the receiving unit. The operation control unit controls an operation of the test part by a shaped command vehicle speed r'(t) obtained by the command vehicle speed shaping unit.

13 Claims, 11 Drawing Sheets

(58) Field of Classification Search
USPC ............ 73/118.01, 114.13–114.15, 123–126,
73/862.08–862.13, 862.191; 701/70,
701/29.1, 29.3, 32.8, 34.2, 34.4
See application file for complete search history.

(56) References Cited

FOREIGN PATENT DOCUMENTS

| JP | 2016008925 A | 1/2016 |
| JP | 2017111116 A | 6/2017 |

OTHER PUBLICATIONS

SAE International by Ford Motor Co., "Drive Quality Evaluation for Chassis Dynamometer Testing", J2951, Revised Jan. 2014 (Superseding J2951 Nov. 2011), pp. 1-27, SAE International.
International Search Report for Application No. PCT/JP2021/010562, dated Apr. 20, 2021, 38 Pages.

\* cited by examiner

(1) FIRST SHAPING METHOD (2) SECOND SHAPING METHOD

FIG.5

(3) THIRD SHAPING METHOD (4) FOURTH SHAPING METHOD

TEST PART AUTOMATIC OPERATION DEVICE, TEST PART TESTING SYSTEM, TEST PART AUTOMATIC OPERATION METHOD, AND NON-TRANSITORY COMPUTER READABLE MEDIUM

CROSS-REFERENCE TO RELATED APPLICATIONS

This application is the U.S. national phase of PCT Application No. PCT/JP2021/010562, filed Mar. 16, 2021, which claims priority to Japanese Patent Application No. 2020-052595, filed Mar. 24, 2020, which are both incorporated by reference herein in their entireties.

FIELD

The present invention relates to a test part automatic operation device and a test part automatic operation method for automatically operating a test vehicle or a test part serving as a part of the test vehicle based on a command vehicle speed, a test part testing system using the test part automatic operation device, and a command vehicle speed generation device that generates the command vehicle speed for automatically operating the test vehicle or the test part serving as a part of the test vehicle.

BACKGROUND

To test a vehicle, there has been conventionally developed a method of automatically operating the vehicle on a chassis dynamometer, for example, by causing the vehicle to drive in a predetermined driving pattern using an automatic operating robot that operates an accelerator, a brake, and the like of the vehicle.

The automatic operating robot receives a command vehicle speed based on a driving pattern defined by laws and regulations or the like. Examples of the laws and regulations of various countries include, but are not limited to, JC08 (Japan), NEDC (Europe), WLTP (mainly Japan, Europe, etc.), FTP75 (US), US06 (US), HWFET (US), SC03 (US), etc.

The automatic operating robot uses the received command vehicle speed as a target value and causes an actual vehicle speed to follow the command vehicle speed by operating the accelerator and the brake using a control algorithm of a two-degree-of-freedom control system. The two-degree-of-freedom control system includes feedback control using a deviation between the command vehicle speed and the actual vehicle speed at the current time and feedforward control using a differential value (command acceleration) of a future command vehicle speed obtained after a certain time (look-ahead time) has elapsed since the current time.

To enable driving in a smooth mode closer to driving by a person using an automatic operating robot, Patent Literature 1, for example, discloses a method of determining acceleration of a vehicle such that the value of an evaluation function including a term proportional to the square of the acceleration is an extreme value to generate a command vehicle speed based on the acceleration.

CITATION LIST

Patent Literature

Patent Literature 1: Japanese Patent Application Laid-open No. 2016-8925

SUMMARY

Technical Problem

There are individual differences in people's driving style (e.g., driving accuracy, roughness, and smoothness represented by the values of RMSSE and IWR in SAE J2951 "Drive Quality Evaluation for Chassis Dynamometer Testing" and by the amount of pedal depression) due to differences in driving skills and other factors. Therefore, tests on a chassis dynamometer are expected to measure and evaluate variations in vehicle fuel consumption and emission test results due to differences in driving style. Using the command vehicle speed generation device described in Patent Literature 1 can simply achieve driving in a smooth mode closer to driving by a person and fails to reproduce differences in driving style.

In view of the disadvantage described above, a main object of the present invention is to enable the measuring and evaluating of variations in vehicle fuel consumption and emission test results due to differences in people's driving style.

Solution to Problem

A test part automatic operation device according to the present invention automatically operates a test vehicle or a test part serving as a part of the test vehicle based on a command vehicle speed. The test part automatic operation device includes a receiving unit configured to receive a driving mode set or changed by a user, a command vehicle speed shaping unit configured to shape the command vehicle speed based on the driving mode received by the receiving unit, and an operation control unit configured to control an operation of the test part by the shaped command vehicle speed obtained by the command vehicle speed shaping unit.

With this configuration, the test part automatic operation device can shape the command vehicle speed based on the driving mode set or changed by the user. Consequently, the test part automatic operation device can reproduce various driving modes. As a result, the test part automatic operation device enables the measuring and evaluating of variations in vehicle fuel consumption and emission test results due to differences in people's driving mode (driving style).

Specifically, the test part automatic operation device further includes an operating unit configured to automatically operate the test part. The operation control unit preferably controls the operating unit based on the shaped command vehicle speed. With this configuration, the test part automatic operation device can reproduce various driving modes by the operating unit.

To be able to set the driving mode, such as roughness and smoothness in driving, by an objective index, the driving mode preferably has a value relating to work or a value relating to vehicle speed followability set as a parameter. In this case, the command vehicle speed shaping unit shapes the command vehicle speed based on at least one of the value relating to work and the value relating to vehicle speed followability.

Specifically, the value relating to work is IWR (inertial work rating), ASCR (absolute speed change rating), ER (energy rating), DR (distance rating), EER (energy economy rating), or a value relating to IWR, ASCR, ER, DR, or EER, and the value relating to vehicle speed followability is RMSSE (root mean squared speed error) or a value relating to RMSSE.

In WLTP, for example, IWR and RMSSE are evaluation indexes in a certification test and have an acceptable range to pass the certification test. If the user can optionally set IWR and RMSSE within or outside the acceptable range, it is possible to measure and evaluate variations in vehicle fuel economy and emissions test results due to more differences in the driving mode. For this reason, in the test part automatic operation device according to the present invention, the value relating to work or the value relating to vehicle speed followability can be optionally set by the user. The operation control unit is preferably configured such that the user can optionally change the driving mode of the test part based on the value relating to work or the value relating to vehicle speed follow/ability set by the user.

In one aspect of shaping the command vehicle speed by the command vehicle speed shaping unit, the command vehicle speed shaping unit shapes the command vehicle speed using a predetermined evaluation function having an acceleration command value and a deviation between the command vehicle speed and an actual vehicle speed as parameters (by optimizing the predetermined evaluation function) based on the driving mode received by the receiving unit.

Specifically, the command vehicle speed shaping unit uses a function obtained by adding a value relating to the acceleration command value weighted by a positive value parameter to a value relating to the deviation between the command vehicle speed and the actual vehicle speed as the predetermined evaluation function. The command vehicle speed shaping unit determines the positive value parameter based on the driving mode received by the receiving unit and shapes the command vehicle speed using the positive value parameter. The positive value parameter can also be used as a parameter to set the driving mode.

To facilitate the process of determining the positive value parameter, the test part automatic operation device further includes a combination data storage unit configured to store therein a lookup table or a predetermined arithmetic expression indicating a combination of the positive value parameter corresponding to the driving mode received by the receiving unit. The command vehicle speed shaping unit preferably determines the positive value parameter using the lookup table or the predetermined arithmetic expression.

In another aspect of shaping the command vehicle speed by the command vehicle speed shaping unit, the command vehicle speed shaping unit shapes the command vehicle speed by a predetermined control arithmetic algorithm. In other words, the command vehicle speed shaping unit simulates and calculates a control result by the predetermined control arithmetic algorithm and determines the control result to be the shaped command vehicle speed. The control arithmetic algorithm includes a feedforward control unit configured to input a value obtained by differentiating the command vehicle speed to be shaped obtained after a predetermined look-ahead time has elapsed and multiplying acceleration obtained by the differentiation by a predetermined feedforward gain value to a model of the test part. In this case, the command vehicle speed shaping unit preferably determines the look-ahead time and/or the feedforward gain value based on the driving mode received by the receiving unit and shapes the command vehicle speed using the look-ahead time and/or the feedforward gain value. The look-ahead time and/or the feedforward gain value can also be used as a parameter to set the driving mode.

In still another aspect of shaping the command vehicle speed by the command vehicle speed shaping unit, the control arithmetic algorithm further includes a feedback control unit configured to multiply the deviation between the command vehicle speed and the actual vehicle speed by a predetermined feedback gain value, adds an output from the feedforward control unit and an output from the feedback control unit to obtain a value, and inputs the obtained value to the model of the test part. The command vehicle speed shaping unit preferably determines the look-ahead time and/or the feedforward gain value and the feedback gain value based on the driving mode received by the receiving unit and shapes the command vehicle speed using the look-ahead time and/or the feedforward gain value and the feedback gain value.

To facilitate the process of determining the look-ahead time and the feedforward gain value, the test part automatic operation device according to the present invention further includes a combination data storage unit configured to store therein a lookup table or a predetermined arithmetic expression indicating a combination of the look-ahead time and the gain value corresponding to the driving mode received by the receiving unit. The command vehicle speed shaping unit preferably determines the look-ahead time and the feedforward gain value using the lookup table or the predetermined arithmetic expression.

If the positive value parameter or the look-ahead time and the feedforward gain value are determined using the lookup table, and the vehicle is driven at the command vehicle speed shaped by the positive value parameter or the look-ahead time and the feed forward gain value, there may possibly be divergence between the command vehicle speed and the actual vehicle speed due to various factors. For this reason, the test part automatic operation device according to the present invention further includes a combination data correcting unit configured to correct the lookup table or the predetermined arithmetic expression based on actual driving data on the test part. The command vehicle speed shaping unit preferably shapes the command vehicle speed using the corrected lookup table or the corrected predetermined arithmetic expression.

To improve user-friendliness, the test part automatic operation device according to the present invention further includes a screen display unit configured to display a setting screen for setting the driving mode or a shaping method on a display. The receiving unit preferably receives the driving mode or the shaping method set on the setting screen.

A command vehicle speed generation device according to the present invention generates a command vehicle speed for automatically operating a test vehicle or a test part serving as a part of the test vehicle. The command vehicle speed generation device includes a receiving unit configured to receive a driving mode set or changed by a user and a command vehicle speed shaping unit configured to shape the command vehicle speed based on the driving mode received by the receiving unit.

A test part testing system according to the present invention includes a chassis dynamometer configured to perform a driving test on a test vehicle or a test part serving as a part of the test vehicle and the test part automatic operation device described above.

A test part automatic operation method according to the present invention is a method for automatically operating a test vehicle or a test part serving as a part of the test vehicle based on a command vehicle speed. The test part automatic operation method includes receiving a driving mode set or changed by a user, shaping the command vehicle speed based on the received driving mode, and controlling an operation of the test part by the shaped command vehicle speed resulting from the shaping.

A command vehicle speed generation program according to the present invention is a computer program for generating a command vehicle speed for automatically operating a test vehicle or a test part serving as a part of the test vehicle. The command vehicle speed generation program causes a computer to implement a function of a receiving unit configured to receive a driving mode set or changed by a user and a command vehicle speed shaping unit configured to shape the command vehicle speed based on the driving mode received by the receiving unit.

Advantageous Effects of Invention

The present invention described above enables the measuring and evaluating of variations in vehicle fuel consumption and emission test results due to differences in people's driving mode (driving style) because the command vehicle speed is shaped based on the driving mode set or changed by the user.

REFERENCE SIGNS LIST 100 automatic operation device
V test vehicle (test part)
2 operating unit
3 operation control unit
4 command vehicle speed generating unit (command vehicle speed generation device)
41 receiving unit
42 command vehicle speed shaping unit
C control arithmetic algorithm
C1 feedforward control unit
43 screen display unit
44 combination data storage unit
45 combination data correcting unit

DESCRIPTION OF EMBODIMENTS

A test part automatic operation device according to an embodiment of the present invention is described below with reference to the drawings.

Figure 1:
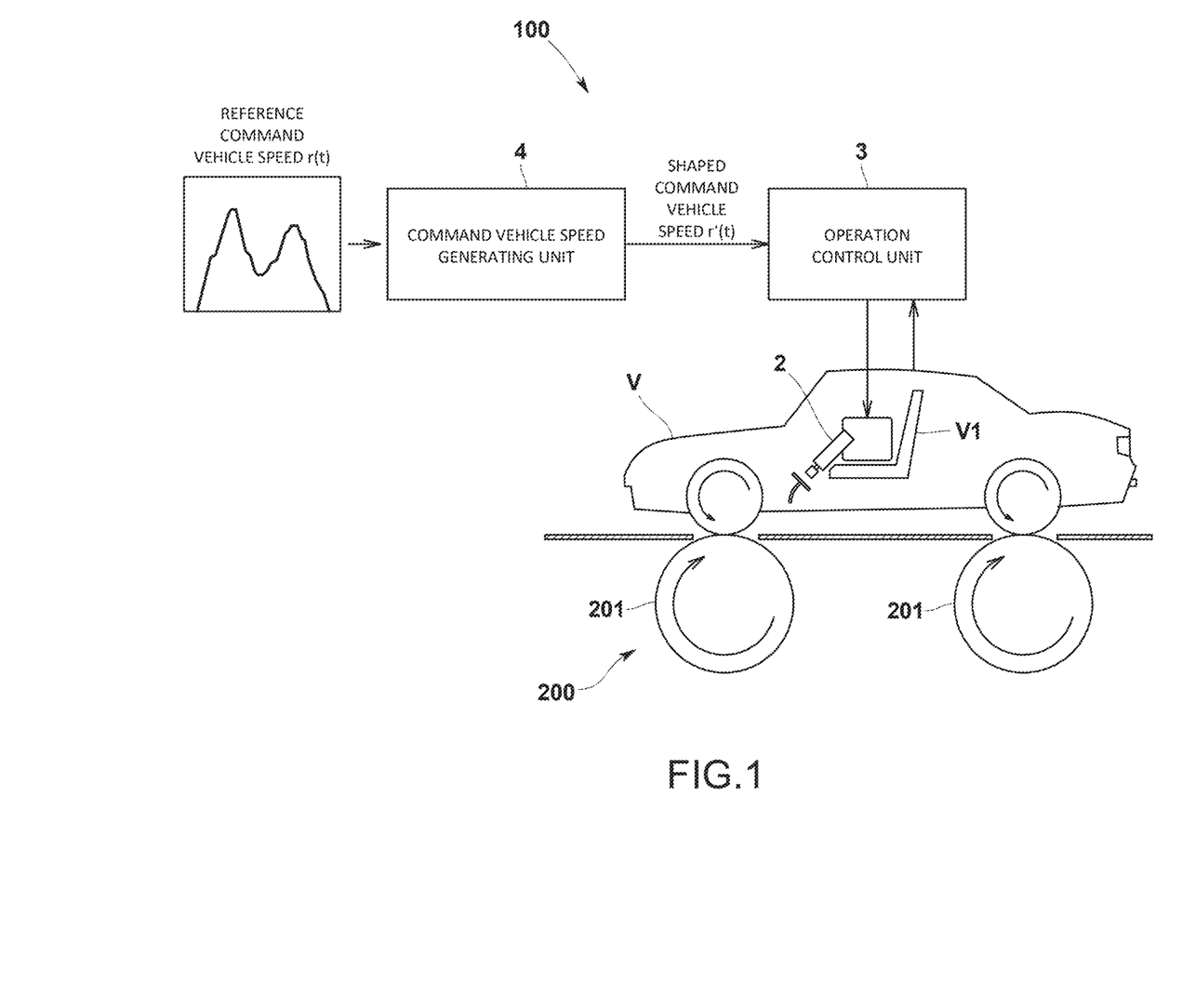
FIG. 1 is a general schematic diagram of a test part automatic operation device according to an embodiment of the present invention.

As illustrated in FIG. 1, a test part automatic operation device 100 according to the present embodiment includes an operating unit 2, an operation control unit 3, and a command vehicle speed generating unit 4. The operating unit 2 automatically operates a completed vehicle V placed on rotating rollers 201 of a chassis dynamometer 200. The operation control unit 3 controls the operating unit 2. The command vehicle speed generating unit 4 generates a command vehicle speed r'(t) input to the operation control unit 3.

The operating unit 2 is placed on the seat of a driver's seat V1 of the vehicle V to operate an accelerator pedal, a brake pedal, a shift lever, an ignition switch, and the like of the vehicle V.

Specifically, the operating unit 2 includes an actuator for an accelerator that depresses and operates the accelerator pedal, an actuator for a brake that depresses and operates the brake pedal, an actuator for a shift lever that operates the shift lever, and an actuator for a switch that operates the ignition switch, for example. In addition, the operating unit 2 may include an actuator for a clutch that depresses and operates a clutch pedal, for example, as necessary.

Figure 2:
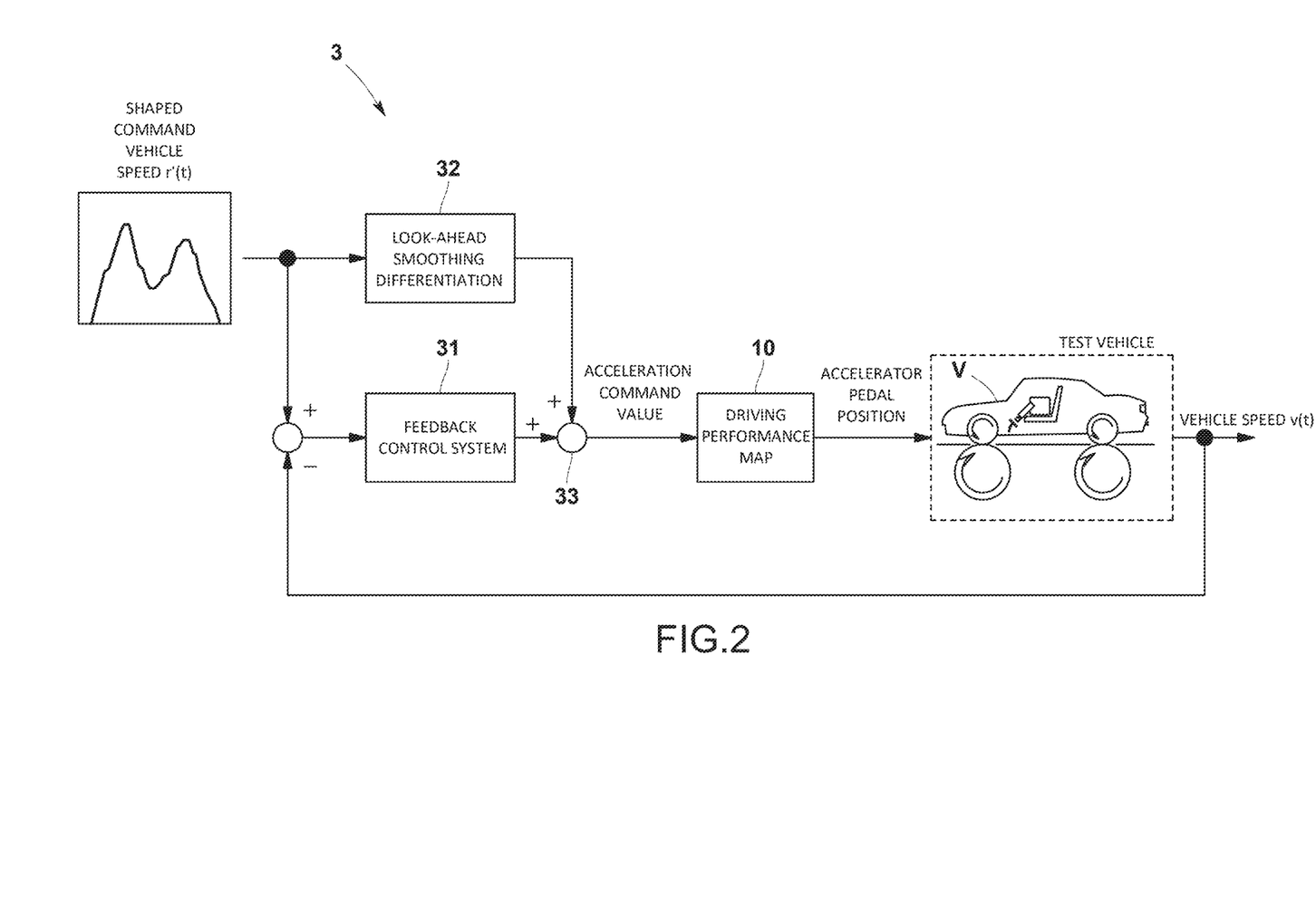
FIG. 2 is a functional block diagram of a control unit that controls an operating unit according to the embodiment.

The operation control unit 3 controls the actuators of the operating unit 2 using the input command vehicle speed r'(t) as a target value, thereby causing an actual vehicle speed of the vehicle V to follow the command vehicle speed r'(t). Specifically, the operation control unit 3 controls the actuators especially the actuator for an accelerator and the actuator for a brake) of the operating unit 2 using a driving performance map 10 as illustrated in FIG. 2. The operation control unit 3 is a computer including a CPU, an internal memory, an input/output interface, an AD converter, and other components and controls the actuators based on an operation control program stored in the internal memory.

The driving performance map 10 refers to data in which the amount of accelerator operation can be obtained from the speed and the acceleration. The driving performance map is created by the following procedures (1) to (3). (1) A learning operation is performed on a test vehicle to obtain the speed and the acceleration at various different accelerator pedal positions. (2) Subsequently, data that associates the accelerator pedal position, the speed, and the acceleration with one another is obtained. (3) Subsequently, data (driving performance map) in which the amount of accelerator operation can be obtained from the speed and acceleration is created based on the data that associates the accelerator pedal position, the speed, and the acceleration with one another.

The operation control unit 3 controls the actuator for an accelerator or the actuator for a brake of the operating unit 2 using a control algorithm of a 2-degree-of-freedom control system. Specifically, the operation control unit 3 includes a feedback control system 31 (e.g., PI control) and a feedforward control system 32. The feedback control system 31 uses a deviation between the command vehicle speed r'(t) and an actual vehicle speed v(t) at the current time. The feedforward control system 32 uses a differential value (command acceleration) of a future command vehicle speed r'(t) obtained after a certain time (look-ahead time) has elapsed since the current time. An adder 33 adds control output obtained by feeding back the deviation between the command vehicle speed r'(t) and the actual vehicle speed v(t) in the feedback control system 31 and the command acceleration obtained in the feedforward control system 32 to obtain an acceleration command value. The operation control unit 3 inputs the obtained acceleration command value to the driving performance map 10 to determine the amount of accelerator operation. Thus, the operation control unit 3 controls the actuator for an accelerator. The operation control unit 3 also controls the actuator for a brake by the same mechanism.

The following describes the command vehicle speed generating unit 4 in detail.

The command vehicle speed generating unit 4 generates the command vehicle speed r'(t) to be input to the operation control unit 3. The command vehicle speed generating unit 4 according to the present embodiment shapes a reference command vehicle speed r(t) defined by laws and regulations or the like based on an input from the user and inputs the shaped command vehicle speed r'(t) to the operation control unit 3. The operation control unit 3 controls the actuator for an accelerator or the actuator for a brake using the input shaped command vehicle speed r'(t) as described above. The command vehicle speed generating unit 4 is a computer including a CPU, an internal memory, an input/output interface, an AD converter, and other components, The command vehicle speed generating unit 4 shapes the reference command vehicle speed r(t) based on a command vehicle speed generation program stored in the internal memory to generate the shaped command vehicle speed r'(t).

The reference command vehicle speed r(t) is a vehicle speed determined by a driving pattern defined in JC08 (Japan), NEDC (Europe), WLTP (mainly Japan, Europe, etc.), FTP75 (USA), US06 (USA), HWFET (USA), or SC03 (USA), for example.

Figure 3:
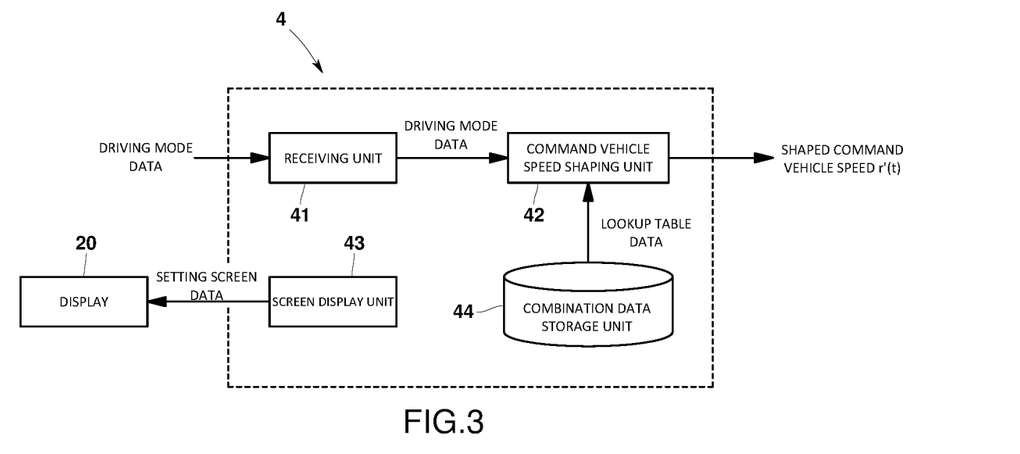
FIG. 3 is a functional block diagram of a command vehicle speed generating unit according to the embodiment.

Specifically, as illustrated in FIG. 3, the command vehicle speed generating unit 4 includes a receiving unit 41 and a command vehicle speed shaping unit 42. The receiving unit 41 receives a driving mode set or changed by the user. The command vehicle speed shaping unit 42 shapes the reference command vehicle speed r(t) based on the driving mode received by the receiving unit 41.

The driving mode according to the present embodiment has a value relating to work and a value relating to vehicle speed followability set as parameters.

Examples of the value relating to work include, but are not limited to, the following driving indexes (operating indexes) (1) to (5).
(1) IWR (Inertial Work Rating)
  The difference or the ratio between the vehicle's reference inertial work in target driving based on the driving pattern and the vehicle's actual inertial work in actual driving
(2) ASCR (Absolute Speed Change Rating)
  The difference or the ratio between the vehicle's reference instantaneous acceleration in target driving based on the driving pattern and the vehicle's actual instantaneous acceleration in actual driving
(3) ER (Energy Rating)
  The difference or the ratio between the vehicle's reference accumulated work in target driving based on the driving pattern and the vehicle's actual accumulated work in actual driving
(4) DR (Distance Rating)
  The difference or the ratio between the vehicle's reference accumulated distance in target driving based on the driving pattern and the vehicle's actual accumulated distance in actual driving
(5) EER (Energy Economy Rating)
  The ratio of the driving distance per unit work expressed by "DR/ER"

Examples of the value relating to vehicle speed followability include, but are not limited to, the following driving index (operating index) (6).
(6) RMSSE (Root Mean Squared Speed Error)
  The mean square value of the difference between the command vehicle speed and the actual speed The receiving unit 41 according to the present embodiment is configured to receive IWR and RMSSE as the parameters of the driving mode.

The command vehicle speed generating unit 4 according to the present embodiment includes a screen display unit 43 that displays a setting screen W (refer to FIG. 4) for setting the driving mode on a display 20. The receiving unit 41 receives IWR and RMSSE input to a IWR input field S1 and a RMSSE input field S2 of the setting screen W.

Figure 4:
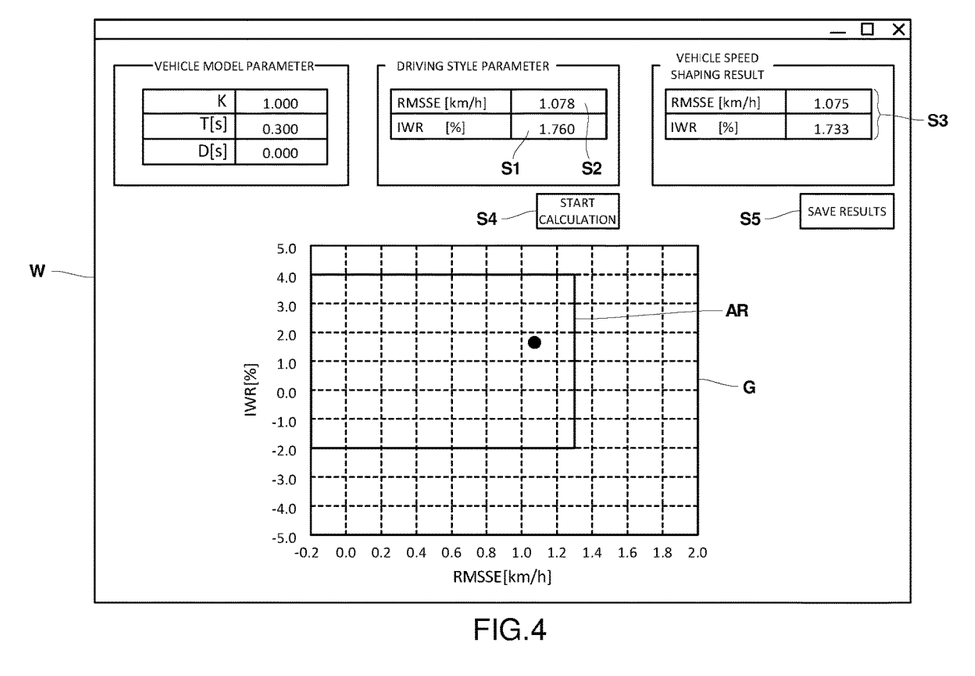
FIG. 4 is a diagram of an example of a setting screen according to the embodiment.

In addition, the setting screen W may display the following contents. The setting screen W, for example, displays a two-dimensional graph G with IWR on one axis and RMSSE on the other axis. In the graph G, the positions of IWR and RMSSE set by the user and an acceptable range AR defined by WLTP (certification test) are displayed in a visually recognizable manner. To make the acceptable range AR visually recognizable, the acceptable range AR may be displayed with a frame line or in a different color. In addition, the setting screen W may include a result display field S3 for displaying the results of IWR and RMSSE resulting from shaping by the command vehicle speed shaping unit 42. The setting screen W may also display a "Start Calculation" button S4 for starting a shaping arithmetic operation of the command vehicle speed r(t) or a "Display Results" button S5 for saving the shaping results (shaped command vehicle speed r'(t), IWR, and RMSSE) in a data storage unit.

The command vehicle speed shaping unit 42 shapes the reference command vehicle speed r(t) so as to achieve IWR and RMSSE received by the receiving unit 41. Specifically, the command vehicle speed shaping unit 42 adjusts at least one of the following four parameters or a combination thereof to generate the shaped command vehicle speed r'(t) from the reference command vehicle speed r(t).

<First Shaping Method>

Figure 5:
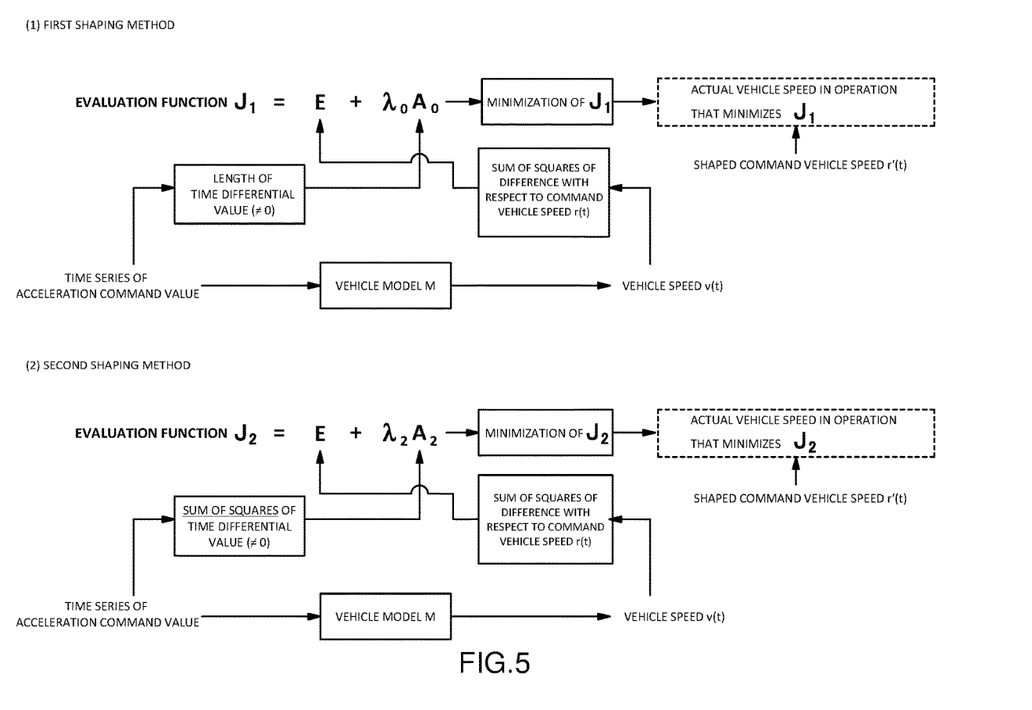
FIG. 5 is a diagram of first and second shaping methods performed by a command vehicle speed shaping unit according to the embodiment.

Now, consider an evaluation function $J_1$ obtained by adding the length $A_0$ of time in which the acceleration command value changes (length of the time differential value ($\neq 0$) of the acceleration command value) weighted by a positive value parameter $\lambda_0$ to the sum of squares E of the deviation (vehicle speed deviation) between the command vehicle speed r(t) and the actual vehicle speed v(t) as illustrated in (1) of FIG. 5.

$$J_1 = E + \lambda_0 A_0$$

The sum of squares E of the vehicle speed deviation corresponds mainly to RMSSE, and the length $A_0$ of the time differential value of the acceleration command value represents the sum of the rate of change in acceleration (representing accelerator frequency) and corresponds mainly to IWR. The time differential value of the acceleration command value is calculated by forward difference or central difference, for example. Instead of the sum of squares E, the command vehicle speed shaping unit 42 may use any one of the sum of first power and the sum of third to N-th power of the vehicle speed deviation.

The command vehicle speed shaping unit 42 calculates the sum of squares E of the vehicle speed deviation and the length $A_0$ of the time differential value of the acceleration command value for a certain time series of the acceleration command vale: using an acceleration responsiveness model (vehicle model) M approximated by a transfer function or the like.

The command vehicle speed shaping unit 42 determines the parameter $\lambda_0$ based on IWR and RMSSE input by the user and derives the operation that minimizes the evaluation function $J_1$ with the parameter $\lambda_0$ by optimization calculation. The command vehicle speed shaping unit determines the actual vehicle speed v(t) in the operation that minimizes the evaluation function $J_1$ to be the shaped command vehicle speed r'(t). The optimization calculation of the evaluation function $J_1$ can be performed by a numerical calculation method, such as sparse optimization.

<Second Shaping Method>

Now, consider an evaluation function $J_2$ obtained by adding the sum of squares $A_2$ of change in the acceleration command value per unit time (time differential value of the acceleration command value) weighted by a positive value parameter $\lambda_2$ to the sum of squares E of the deviation (vehicle speed deviation) between the command vehicle speed r(t) and the actual vehicle speed v(t) as illustrated in (2) of FIG. 5.

$$J_2 = E + \lambda_2 A_2$$

The sum of squares E of the vehicle speed deviation corresponds mainly to RMSSE, and the sum of squares $A_2$ of change in the acceleration command value represents the sum of the rate of change in acceleration (representing accelerator frequency) and corresponds mainly to IWR. The time differential value of the acceleration command value is calculated by forward difference or central difference, for example. Instead of the sum of squares E, the command vehicle speed shaping unit 42 may use any one of the sum of first power and the sum of third to N-th power of the vehicle speed deviation. Instead of the sum of squares $A_2$, the command vehicle speed shaping unit 42 may use any one of the sum of first power and the sum of third to N-th power of change in the acceleration command value.

The command vehicle speed shaping unit 42 calculates the sum of squares E of the vehicle speed deviation and the sum of squares $A_2$ of the time differential value of the acceleration command value for a certain time series of the acceleration command value using the vehicle model M described above.

The command vehicle speed shaping unit 42 determines the parameter $\lambda_2$ based on IWR and RMSSE input by the user and derives the operation that minimizes the evaluation function $J_2$ with the parameter $\lambda_2$ by optimization calculation. The command vehicle speed shaping unit 42 determines the actual vehicle speed v(t) in the operation that minimizes the evaluation function $J_1$ to be the shaped command vehicle speed r'(t). The optimization calculation of the evaluation function $J_2$ can be performed by a numerical calculation method, such as the least squares method.

<Third Shaping Method>

As illustrated in (3) of FIG. 6, the command vehicle speed shaping unit 42 has a control arithmetic algorithm C of a 2-degree-of-freedom control system described below.

The control arithmetic algorithm C includes a feed forward control unit C1 and a feedback control unit C2. The feedforward control unit C1 differentiates the command vehicle speed to be shaped r(t) obtained after a predetermined look-ahead time $T_p$ has elapsed and multiplies acceleration $a_r(t)$ obtained by the differentiation by a predetermined feedforward gain value $K_{FF}$. The feedback control unit C2, such as PID control, uses the deviation between the command vehicle speed r(t) and the actual vehicle speed v(t). The control arithmetic algorithm C adds the output from the feedforward control unit C1 and the output from the feedback control unit C2 by an adder C3 to obtain an acceleration command value a(t). The control arithmetic algorithm C inputs the obtained acceleration command value a(t) to the vehicle model M described above to determine the amount of pedal depression. Thus, the control arithmetic algorithm C calculates the actual vehicle speed v(t).

The command vehicle speed shaping unit 42 determines the look-ahead time $T_p$ serving as the parameter based on IWR and RMSSE input by the user and calculates the actual vehicle speed v(t) by the control arithmetic algorithm C described above. The command vehicle speed shaping unit 42 determines the actual vehicle speed v(t) obtained by the control arithmetic algorithm C to be the shaped command vehicle speed r'(t). For example, a longer look-ahead time $T_p$ reproduces smooth driving, and a shorter look-ahead time $T_p$ reproduces rough driving.

<Fourth Shaping Method>

Figure 6:
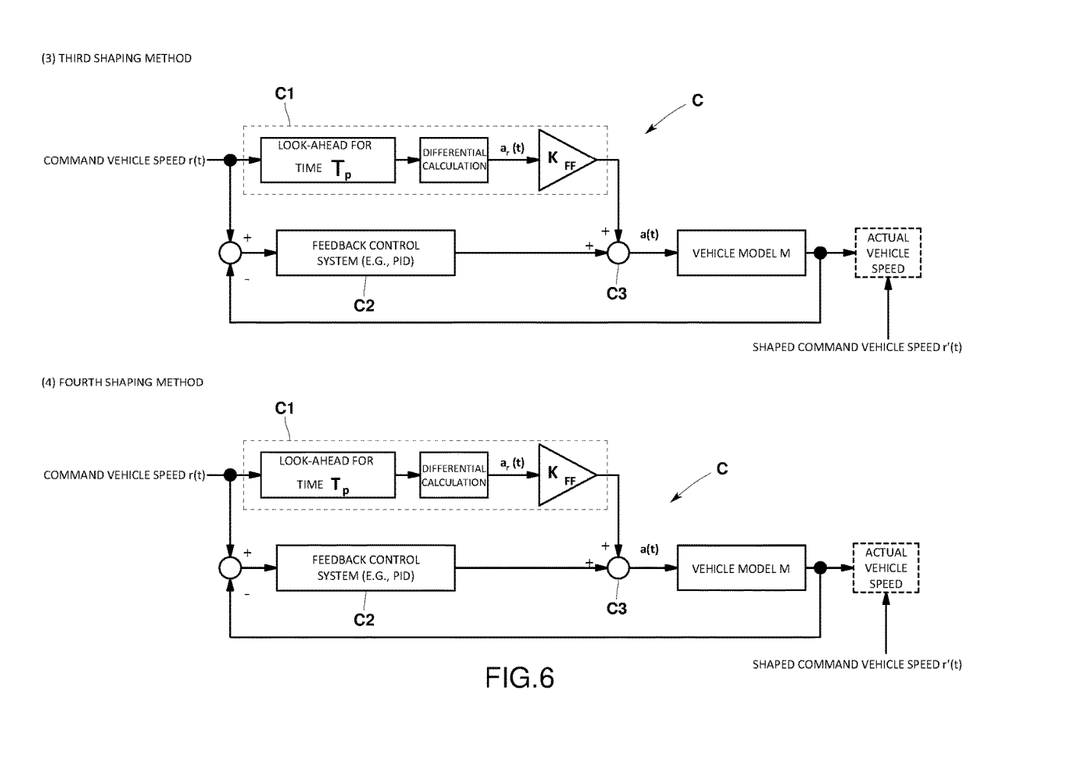
FIG. 6 is a diagram of third and fourth shaping methods performed by the command vehicle speed shaping unit according to the embodiment.

As illustrated in (4) of FIG. 6, the command vehicle speed shaping unit 42 determines the feedforward gain value $K_{FF}$ serving as the parameter based on IWR and RMSSE input by the user and calculates the actual vehicle speed v(t) by the control arithmetic algorithm C described above. The command vehicle speed shaping unit 42 determines the actual vehicle speed v(t) obtained by the control arithmetic algorithm C to be the shaped command vehicle speed r'(t).

<Fifth Shaping Method>

Figure 7:
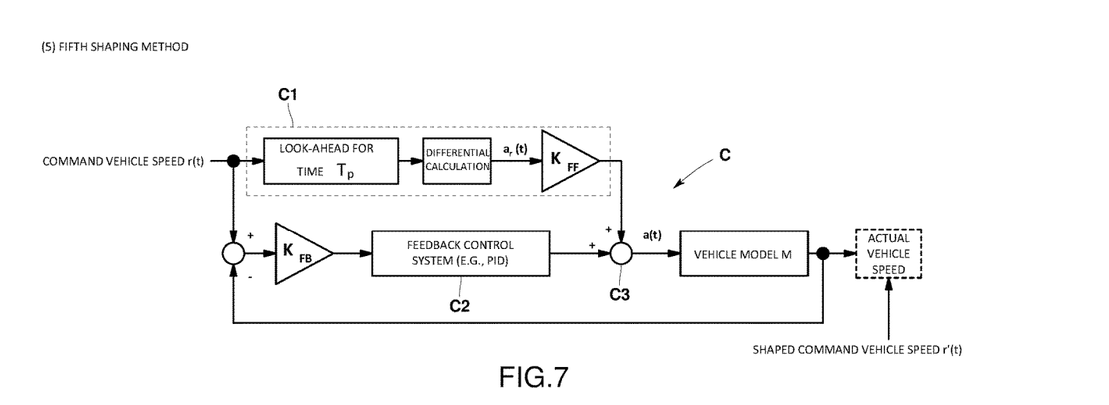
FIG. 7 is a diagram of a fifth shaping method performed by the command vehicle speed shaping unit according to the embodiment.

As illustrated in FIG. 7, the command vehicle speed shaping unit 42 has the control arithmetic algorithm C of a 2-degree-of-freedom control system described below.

The control arithmetic algorithm C includes the feedforward control unit C1 and the feedback control unit C2. The feedforward control unit C1 differentiates the command vehicle speed to be shaped r(t) obtained after the predetermined look-ahead time $T_p$ has elapsed and multiplies the acceleration $a_r(t)$ obtained by the differentiation by the predetermined feedforward gain value $K_{FF}$. The feedback control unit C2 performs PM control or the like by multiplying the deviation between the command vehicle speed r(t) and the actual vehicle speed v(t) by a predetermined feedback gain value $K_{FB}$. The control arithmetic algorithm C adds the output from the feedforward control unit C1 and the output from the feedback control unit C2 by an adder C3 to obtain an acceleration command value a(t). The control arithmetic algorithm C inputs the obtained acceleration command value a(t) to the vehicle model M described above to determine the amount of pedal depression. Thus, the control arithmetic algorithm C calculates the actual vehicle speed v(t).

The command vehicle speed shaping unit 42 determines the look-ahead time $T_p$ or the feedforward gain value $K_{FF}$ and the feedback gain value $K_{FB}$ serving as the parameter based on IWR and RMSSE input by the user and calculates the actual vehicle speed v(t) by the control arithmetic algorithm C described above. The command vehicle speed shaping unit 42 determines the actual vehicle speed v(t) obtained by the control arithmetic algorithm C to be the shaped command vehicle speed r'(t). For example, a larger feedback gain value $K_{FB}$ reproduces rough driving.

The command vehicle speed shaping unit 42 may generate the shaped command vehicle speed r'(t) by combining at least two or more of the first to the fifth shaping methods described above. Alternatively, the command vehicle speed shaping unit 42. may generate the shaped command vehicle speed r'(t) by using any one of the first to the fifth shaping methods described above. To combine the first or the second shaping method and the third, the fourth, or the fifth shaping method, for example, the shaped command vehicle speed r'(t) obtained by the first or the second shaping method may be input to the control arithmetic algorithm C as the command vehicle speed to be shaped r(t).

The following describes the combination of the third and the fourth shaping methods.

Figure 8:
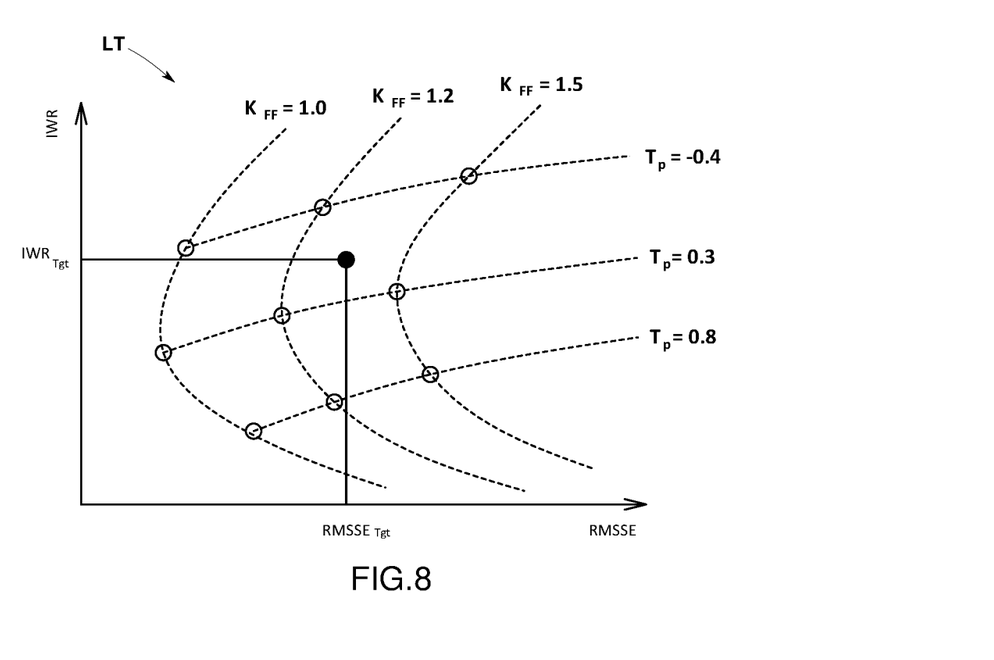
FIG. 8 is a schematic diagram of a combination of $T_p$ and $K_{FF}$ (lookup table) corresponding to IWR and RMSSE according to the embodiment.

In this case, the command vehicle speed generating unit 4 further includes a combination data storage unit 44 that stores therein a lookup table LT (refer to FIG. 8) or a predetermined arithmetic expression (polynomial expression) indicating the combination of the look-ahead time $T_p$ and the feedforward gain value $K_{FF}$ corresponding to the driving mode (values of IWR and RMSSE). The lookup table also includes the following two functions that approximate IWR and RMSSE from a vehicle speed shaping parameter ($T_p$ and $K_{FF}$) created by an appropriate interpolation method, such as bilinear interpolation. The predetermined arithmetic expression (polynomial expression) can be generated by simulation or machine learning, for example.

$$IWR = f_{IWR}(K_{FF}, T_p)$$

$$RMSSE = f_{RMSSE}(K_{FF}, T_p)$$

The command vehicle speed shaping unit 42 determines the look-ahead time $T_p$ and the feedforward gain value $K_{FF}$ using the values of IWR and RMSSE received by the receiving unit 41 and the lookup table LT. Specifically, the command vehicle speed shaping unit 42 solves bivariate equations $IWR = f_{IWR}(K_{FF}, T_p)$ and $RMSSE_{Tgt} = f_{RMSSE}(K_{FF}, T_p)$ using the two functions included in the lookup table LT by numerical calculation, such as the Newton's method to determine the look-ahead time $T_p$ and the feedforward gain value $K_{FF}$. The command vehicle speed shaping unit 42 uses the look-ahead time $T_p$ and the feedforward gain value $K_{FF}$ to calculate the actual vehicle speed v(t) by the control arithmetic algorithm C described above and generate the shaped command vehicle speed r'(t).

The command vehicle speed shaping unit 42 inputs the generated shaped command vehicle speed r'(t) to the operation control unit 3. The operation control unit 3 controls the actuators of the operating unit 2 using the input shaped command vehicle speed e(t) as a target value, thereby causing the actual vehicle speed v(t) to follow the shaped command vehicle speed r'(t).

<Advantageous Effects of the Present Embodiment>

The test part automatic operation device 100 according to the present embodiment having the configuration described above can shape the command vehicle speed r(t) based on the driving mode (IWR and RMSSE) set or changed by the user. Consequently, the test part automatic operation device 100 can reproduce various driving modes. As a result, the test part automatic operation device enables the measuring and evaluating of variations in vehicle fuel consumption and emission test results due to differences in people's driving mode (driving style).

Other Embodiments

Figure 9:
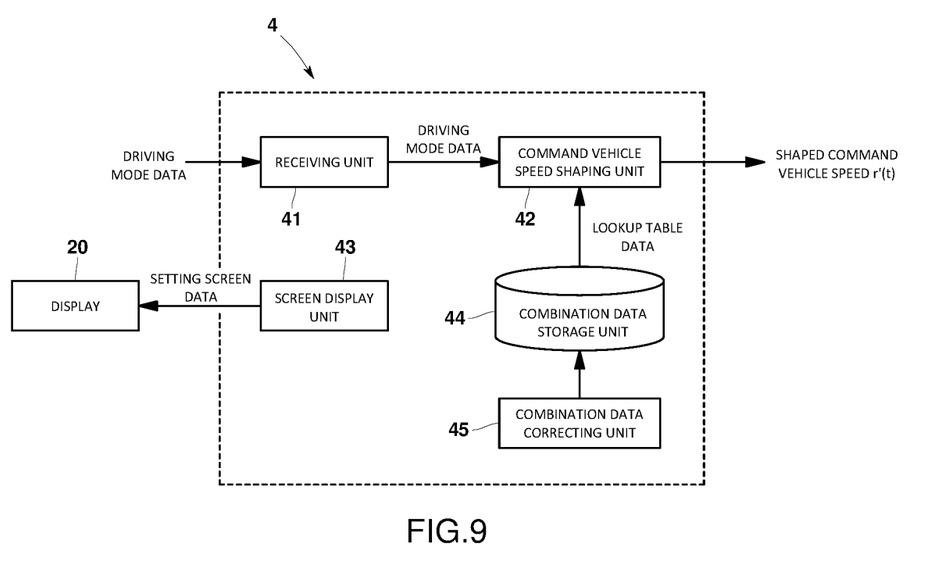
FIG. 9 is a functional block diagram of the command vehicle speed generating unit according to a modification.
Figure 10:
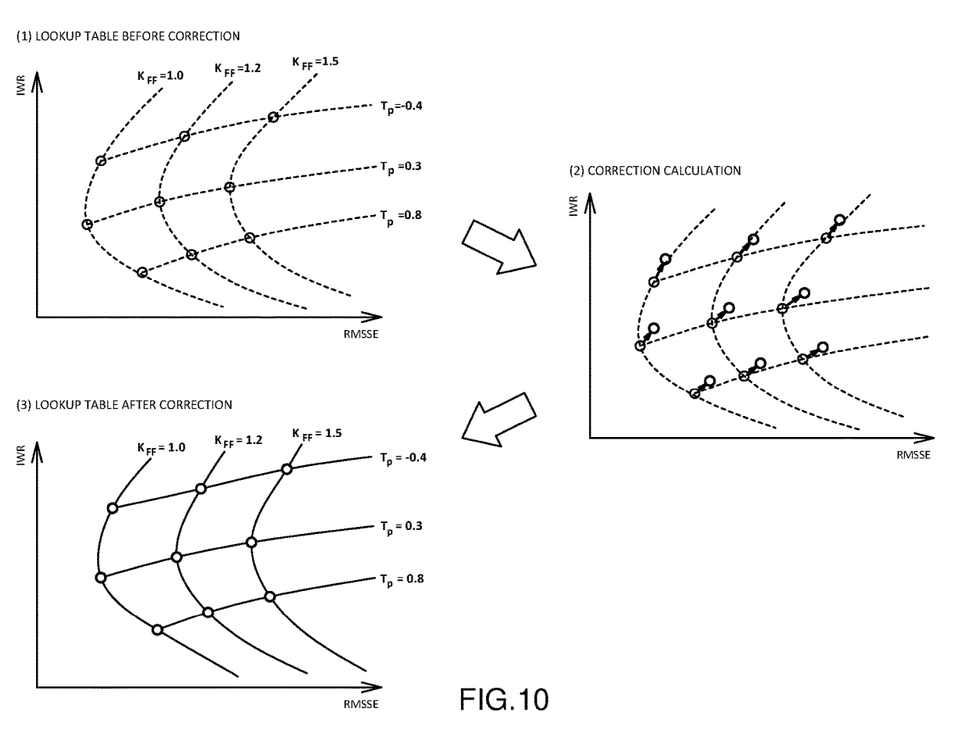
FIG. 10 is a diagram of the lookup table before and after correction by a table correcting unit according to the modification.

As illustrated in FIG. 9, for example, the command vehicle speed generating unit 4 may further include a combination data correcting unit 45 configured to correct the lookup table LT or the predetermined arithmetic expression based on actual driving data on the vehicle V. As illustrated in FIG. 10, the combination data correcting unit 45 corrects sample points of the lookup table LT or the predetermined arithmetic expression and corrects the two functions ($IWR = f_{IWR}(K_{FF}, T_p)$ and $RMSSE = f_{RMSSE}(K_{FF}, T_p)$) that approximate IWR and RMSSE.

The command vehicle speed shaping unit 42 determines the look-ahead time L and the feedforward gain value $K_{FF}$ using the corrected lookup table LT or the corrected predetermined arithmetic expression and shapes the command vehicle speed r(t) using the look-ahead time $T_p$ and the feedforward gain value $K_{FF}$.

As described above, the present modification can correct error factors of the vehicle or the like by correcting the lookup table LT or the predetermined arithmetic expression. Consequently, the present modification can reproduce driving closer to the driving mode set by the user.

Figure 11:
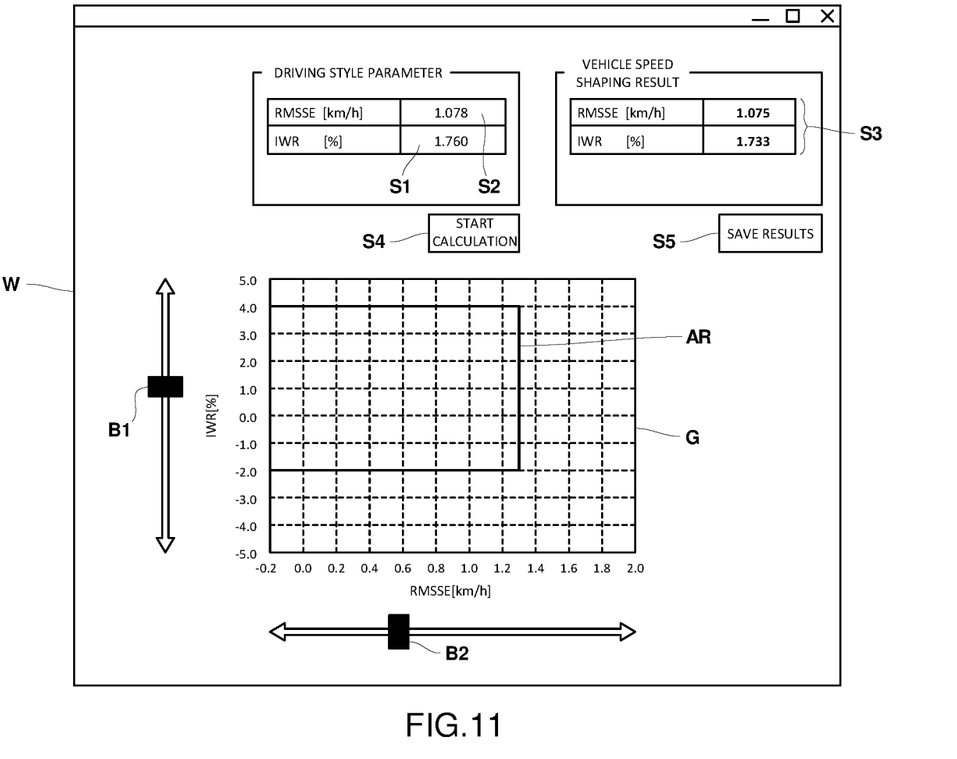
FIG. 11 is a diagram of the setting screen according to another modification.

The setting screen W according to the embodiment above is configured such that the user inputs desired values to the IWR input field S1 and the RMSSE input field S2. Alternatively, the setting screen W may be configured such that values are automatically input to the IWR input field S1 and the RMSSE input field S2 by clicking and selecting a desired position in the two-dimensional graph G displayed on the setting screen W. As illustrated in FIG. 11, the setting screen W may include slide bars B1 and B2 provided along the MR axis and the RMSSE axis, respectively, of the two-dimensional graph G displayed on the setting screen W. In this case, the setting screen W may be configured such that the user can set the values of IWR and RMSSE by sliding and moving the slide bars B1 and B2.

While command vehicle speed generating unit 4 is incorporated in the test part automatic operation device 100 according to the embodiment above, it may be provided as a command vehicle speed generation device separated from the test part automatic operation device 100 (composed of the operating unit 2 and the operation control unit 3).

While the embodiment above uses IWR and RMSSE as the parameter of the driving mode, it may use only IWR or only RMSSE. Alternatively, the embodiment may use other driving indexes (operating indexes) or any other driving indexes described in J2951 as long as they serve as parameters that can change the driving mode.

While the embodiment above tests a completed vehicle, it may test an engine using an engine dynamometer, for example, or may test a powertrain using a dynamometer. The vehicle may be a hybrid vehicle or an electric vehicle.

Various modifications and combinations of the embodiments may be made as long as they do not depart from the spirit of the present invention.

INDUSTRIAL APPLICABILITY

The present invention enables the measuring and evaluating of variations in vehicle fuel consumption and emission test results due to differences in driving style.

The invention claimed is:

1. A test part automatic operation device configured to automatically operate a test vehicle or a test part serving as a part of the test vehicle based on a command vehicle speed, the test part automatic operation device comprising:
a receiving unit configured to receive a driving mode having one or more parameter values defined and selectively changeable by a user and relating to work or an error between the command vehicle speed and actual vehicle speed;
a command vehicle speed shaping unit configured to shape the command vehicle speed based on the driving mode and the one or more parameter values resulting in a shaped command vehicle speed; and an operation control unit configured to control an operation of the test vehicle or test part according to the shaped command vehicle speed.

2. The test part automatic operation device according to claim 1, further comprising an operating unit configured to operate the test vehicle or test part, wherein
the operation control unit is further configured to control the operating unit based on the shaped command vehicle speed.

3. The test part automatic operation device according to claim 1, wherein
the one or more parameter values relate to IWR (inertial work rating), ASCR (absolute speed change rating), ER (energy rating), DR (distance rating), EER (energy economy rating), or RMSSE (root mean squared speed error).

4. The test part automatic operation device according to claim 1, wherein the command vehicle speed shaping unit shapes the command vehicle speed using a predetermined evaluation function having one or more parameter values relating to an acceleration command and the errora between the command vehicle speed and actual vehicle speed.

5. The test part automatic operation device according to claim 4, wherein
the predetermined evaluation function is obtained by adding the parameter value relating to the acceleration command weighted by a positive value parameter to the parameter value relating to the error between the command vehicle speed and actual vehicle speed, and
the command vehicle speed shaping unit determines the positive value parameter based on the driving mode and shapes the command vehicle speed using the positive value parameter.

6. The test part automatic operation device according to claim 5, further comprising a combination data storage unit configured to store therein a lookup table or a predetermined arithmetic expression indicating a combination of the positive value parameter corresponding to the driving mode, wherein
the command vehicle speed shaping unit determines the positive value parameter using the lookup table or the predetermined arithmetic expression.

7. The test part automatic operation device according to claim 6, further comprising a combination data correcting unit configured to correct the lookup table resulting in a corrected lookup table or the predetermined arithmetic expression resulting in a corrected predetermined arithmetic expression based on actual driving data on the test vehicle or test part, wherein
the command vehicle speed shaping unit shapes the command vehicle speed using the corrected lookup table or the corrected predetermined arithmetic expression.

8. The test part automatic operation device according to claim 1, wherein
the command vehicle speed shaping unit shapes the command vehicle speed by a predetermined control arithmetic algorithm,
the control arithmetic algorithm includes a feedforward control unit configured to input a value obtained by differentiating the command vehicle speed to be shaped obtained after a predetermined look-ahead time has elapsed and multiplying acceleration obtained by the differentiation by a predetermined feedforward gain value to a model of the test vehicle or test part, and
the command vehicle speed shaping unit determines the look-ahead time and/or the feedforward gain value based on the driving mode and shapes the command vehicle speed using the look-ahead time and/or the feedforward gain value.

9. The test part automatic operation device according to claim 8, wherein
the control arithmetic algorithm further includes a feedback control unit configured to multiply the error between the command vehicle speed and actual vehicle speed by a predetermined feedback gain value, adds an output from the feedforward control unit and an output from the feedback control unit to obtain a generated value, and inputs the generated value to the model, and
the command vehicle speed shaping unit determines the look-ahead time and/or the feedforward gain value and the feedback gain value based on the driving mode and shapes the command vehicle speed using the look-ahead time and/or the feedforward gain value and the feedback gain value.

10. The test part automatic operation device according to claim 8, further comprising a combination data storage unit configured to store therein a lookup table or a predetermined arithmetic expression indicating a combination of the look-ahead time and the feedforward gain value corresponding to the driving mode, wherein
the command vehicle speed shaping unit determines the look-ahead time and the feedforward gain value using the lookup table or the predetermined arithmetic expression.

11. A test part testing system comprising:
a chassis dynamometer configured to perform a driving test on a test vehicle or a test part serving as a part of the test vehicle; and
the test part automatic operation device according to claim 1.

12. A test part automatic operation method for automatically operating a test vehicle or a test part serving as a part of the test vehicle based on a command vehicle speed, the test part automatic operation method comprising:
receiving by one or more processors a driving mode having one or more parameter values defined and selectively changeable by a user and relating to work or an error between the command vehicle speed and actual vehicle speed;
shaping by the one or more processors the command vehicle speed based on the driving mode and the one or more parameter values resulting in a shaped command vehicle speed; and
controlling by the one or more processors an operation of the test vehicle or test part according to the shaped command vehicle speed.

13. A non-transitory computer readable medium containing instructions for generating a command vehicle speed for automatically operating a test vehicle or a test part serving as a part of the test vehicle, that when executed by a computer, cause the computer to function as:
a receiving unit configured to receive a driving mode having one or more parameter values defined and selectively changeable by a user and relating to work or an error between the command vehicle speed and actual vehicle speed; and
a command vehicle speed shaping unit configured to shape the command vehicle speed based on the driving mode and the one or more parameter values resulting in a shaped command vehicle speed.

* * * * *